United States Patent [19]

Ashby

[11] Patent Number: 5,541,896
[45] Date of Patent: Jul. 30, 1996

[54] INTER-LEAVED CAROUSEL FOR INFORMATION STORAGE MEDIUMS

[76] Inventor: S. Blake Ashby, 7256 Balson, St. Louis, Mo. 63130

[21] Appl. No.: 396,271

[22] Filed: Feb. 28, 1995

Related U.S. Application Data

[62] Division of Ser. No. 14,854, Feb. 8, 1993, abandoned.

[51] Int. Cl.⁶ ................................................. G11B 17/22
[52] U.S. Cl. ......................... 369/37; 369/191; 360/98.04
[58] Field of Search ................................ 369/36, 34, 192, 369/37, 178, 179, 191, 194; 360/98.01, 98.04

[56] References Cited

U.S. PATENT DOCUMENTS

| | | | |
|---|---|---|---|
| 4,670,866 | 6/1987 | Hasegawa et al. | 369/37 |
| 4,701,900 | 10/1987 | Hasegawa et al. | 369/36 |
| 4,734,814 | 3/1988 | Fujino et al. | 360/133 |
| 4,742,405 | 5/1988 | Teranishi | 360/92 |
| 4,750,160 | 6/1988 | Miller et al. | 369/37 |
| 4,815,057 | 3/1989 | Miller et al. | 369/37 |
| 4,855,980 | 8/1989 | Hug et al. | 360/98.01 |
| 4,996,680 | 2/1991 | Staar | 369/36 |
| 4,998,618 | 3/1991 | Borgions | 206/307 |
| 5,001,582 | 3/1991 | Numasaki | 360/98.06 |
| 5,022,020 | 6/1991 | Langman et al. | 369/37 |
| 5,043,963 | 8/1991 | Iwamoto | 369/36 |
| 5,136,562 | 8/1992 | Staar | 369/36 |

OTHER PUBLICATIONS

The Complete Crutchfield Catalog, Winter/Spring 1994, cover page, end page, p. 97.

*Primary Examiner*—A. J. Heinz
*Assistant Examiner*—William R. Korzuch
*Attorney, Agent, or Firm*—Howell & Haferkamp, L. C.

[57] ABSTRACT

A device for storing and retrieving Information Storage Media in which the Information Storage Media are maintained at an angle and in an interleaved arrangement. The device consists of a series of tray cartridges, a mechanism for pulling trays from the cartridges, a mechanism for lifting an Information Storage Medium from the tray, and a mechanism for accessing the information contained in the Information Storage Medium.

19 Claims, 15 Drawing Sheets

INTER-LEAVED CAROUSEL FOR INFORMATION STORAGE MEDIUMS

This is a divisional application Ser. No. 08/014,854 filed on Feb. 8, 1993, now abandoned.

BACKGROUND—FIELD OF THE INVENTION

This invention relates to the storage and retrieval of Information Storage Mediums, in particular an Inter-Leaved arrangement for such Information Storage Mediums.

BACKGROUND—DESCRIPTION OF PRIOR ART

A number of mediums for storing digital or electronic data are currently in use. One such means is an optically based digital data disk. Another such means is an electronically based micro floppy disk. Still another such means is an electronically based digital audio tape.

These information storage mediums (ISMs), due to their functionality, share a largely common shape; they tend to be platter-like, with a high ratio of width and depth to height. The optically based digital data disk offers an example. The disk is constructed of rigid plastic material, with a diameter of approximately 4.7 inches and a height of approximately 0.07 inches. This shape is similar to that of a micro floppy, which forms a square approximately 3.5 inches by 3.5 inches, yet has a height of approximately 0.12 inches.

Users wish to be able to quickly access a multiplicity of these storage mediums. To this end, a number of different devices have been invented to facilitate the storage and retrieval of ISMs. In general, these devices may be categorized in two ways, dependent upon the orientation in which the ISMs are maintained. In one type, the ISMs are maintained horizontally, such that the wide face is parallel to the Y axis. Iwamoto (U.S. Pat. No. 5,043,963) is one such device. In a variation on this horizontally arrangement, the ISMs maybe stacked in parallel planes to form a column. Bourgions (U.S. Pat. No. 4,998,618) is an example of one such device. In another type of device, the ISMs are maintained vertically, such that the ISM is maintained on its narrow edge. In general, devices of this type utilize a torroidal arrangement, in which the ISMS are arranged around a central axis, suggestive of the spokes of a wagon wheel. Teranashi (U.S. Pat. No. 4,742,405) is an example of such a device.

In general, both horizontal and vertical types of storage and retrieval devices suffer disadvantages. The vertical, torroidal arrangement allows the storage of a high number of ISMs within a limited space. However, because the ISMs must be maintained on their narrow edge, gravity is a force which these devices must counteract. A complicated mechanism must be utilized to keep the ISMs in a vertical position. Devices utilizing a horizontal arrangement are much simpler; gravity becomes a force to maintain the ISMs in place, instead of a force which must be counteracted. However, this arrangement greatly limits the number of ISM which may be stored in a limited space. Most users, therefore, would benefit from a configuration which allows a simple device to maintain and access a large number of ISMs.

OBJECTS AND ADVANTAGES

A combination of simplicity and storage is achieved by maintaining the ISMs at an angle, instead of horizontally or vertically. In maintaining an ISM at an angle, an upper edge and a lower edge are created. This allows the inter-leaving of the ISMs; the upper edge of an ISM may be positioned over the lower edge of a subsequent ISM. In this manner, a large number of ISMs may be stored in a limited area. Further, this allows the ISM to be self-repositioning A multiplicity of ISMs may be arranged in a number of different configurations. Suggestive of the torroidal arrangement, the ISMs may be formed into a circle around a central axis. Further, an arc of ISMs may be created, or the ISMs may be arranged in a straight line.

Accordingly, I claim the following objects and advantages of the invention:

(a) to provide a simple device which will store and access a large number of ISMs;

(b) to provide a device which will maintain ISMs in an inter-leaved arrangement;

(c) to provide a device in which the ISMs are self-repositioning.

Readers will find further objects and advantages from a consideration of the accompanying drawings.

DRAWING REFERENCE NUMBERS

| 1 carousel device | 2 disk |
|---|---|
| 3 base | 4 raised circular platform |
| 6 slide groove | 8 bearing ring |
| 9 bearing | 11 gear teeth |
| 13 tray cartridge | 14 curved outer wall |
| 26 exterior opening tray cartridge | 16 angled wall |
| 18 top piece | 19 bottom piece |
| 21 upper tray slide groove | 22 lower tray slide groove |
| 24 disk tray | 25 ISM tray |
| 15 interior edge | 27 exterior edge |
| 29 upper slide | 30 lower slide |
| 32 gripping projection | 33 disk maintaining enclosure |
| 35 interior beveled edge | 36 exterior beveled edge |
| 38 bottom lip | 40 spindle cutout |
| 41 retracting cutout | 42 lift cutout |
| 44 disk accessing mechanism | 46 powering mechanism |
| 47 gear drive mechanism | 48 tray pulling mechanism |
| 49 alternate | 51 spindle mechanism |
| 52 | 54 motor |
| 55 motor stand | 57 motor gear |
| 59 transfer assembly | 60 solenoid |
| 61 bearing ring transfer gear | 62 master transfer gear |
| 65 master gear | 66 upper toothed level |
| 67 lower toothed level | 69 spindle transfer gear |
| 70 spindle screw gear | 72 tray pulling assembly |
| 74 slide | 75 gripping member base |
| 76 gripping member | 78 spindle seat |
| 79 spindle body | 80 spindle lift screw |
| 82 guide slot | 83 spindle guide |
| 84 disk catch projection | 86 I/O base |
| 87 drive motor | 88 reading device |
| 90 drive motor seat | 91 cooperative disk catch opening |
| 93 pivot base | 94 ISM |
| 95 ISM accessing mechanism | 97 ISM reading assembly |
| 98 ISM lifting assembly | 100 ISM lift member |

DETAILED DESCRIPTION

Figure 1:
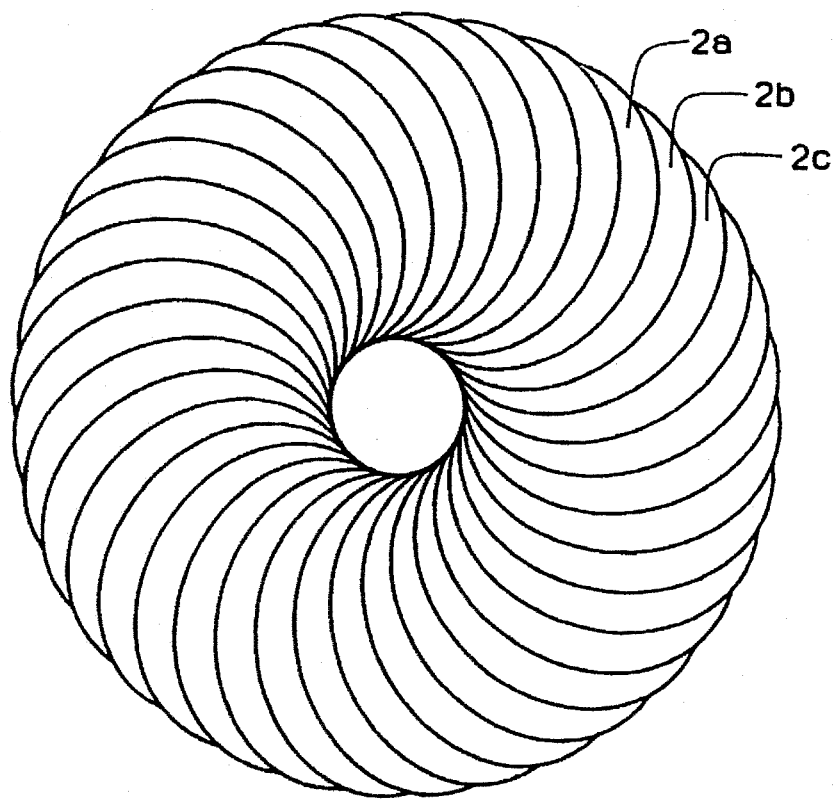
FIG. 1 shows a schematic of disk-shaped ISMs in a narrow diameter inter-leaved arrangement.
Figure 2:
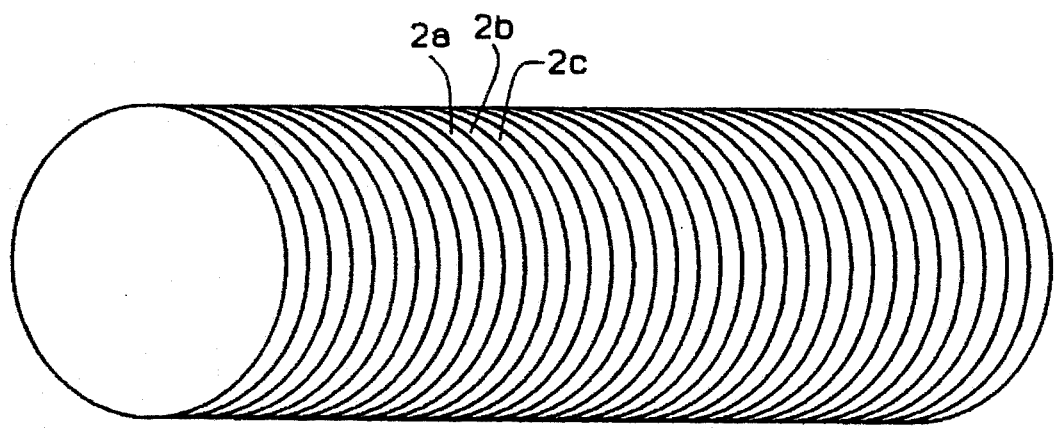
FIG. 2 shows a schematic of disk-shaped ISMs in a straight line inter-leaved arrangement.
Figure 3:
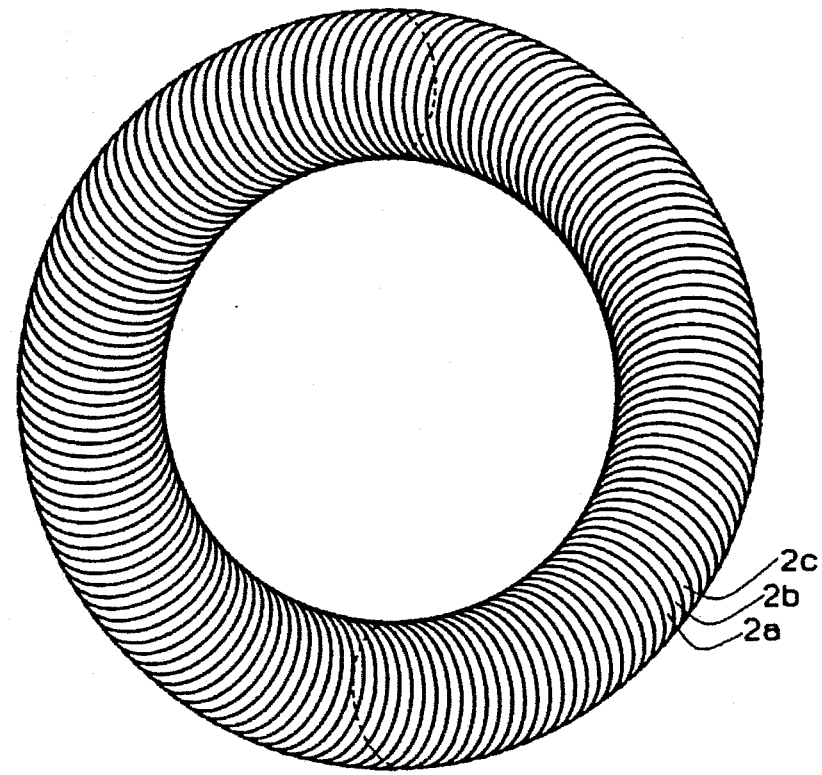
FIG. 3 shows a schematic of disk-shaped ISMs in a wide diameter inter-leaved arrangement.
Figure 4:
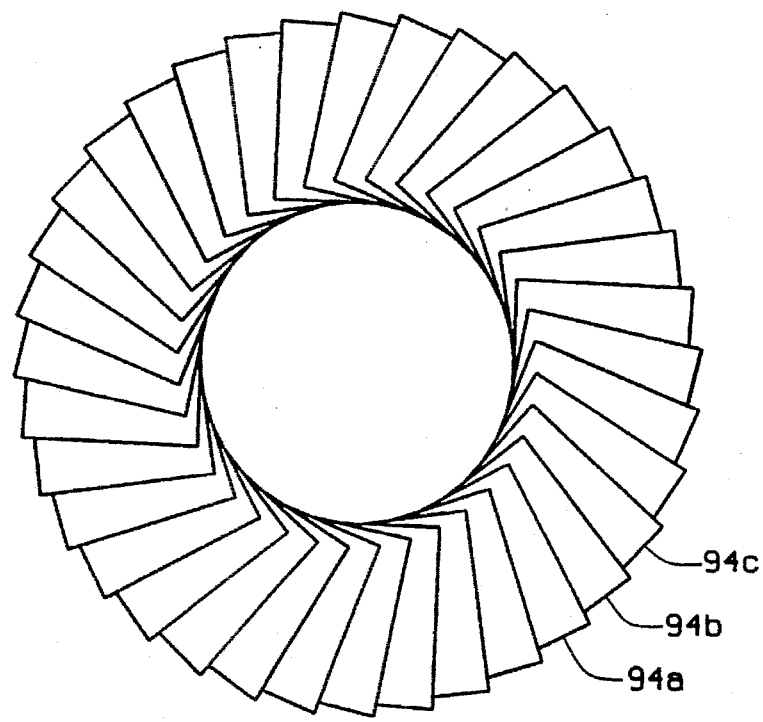
FIG. 4 shows a schematic of square ISMs in a wide diameter inter-leaved arrangement.
Figure 5:
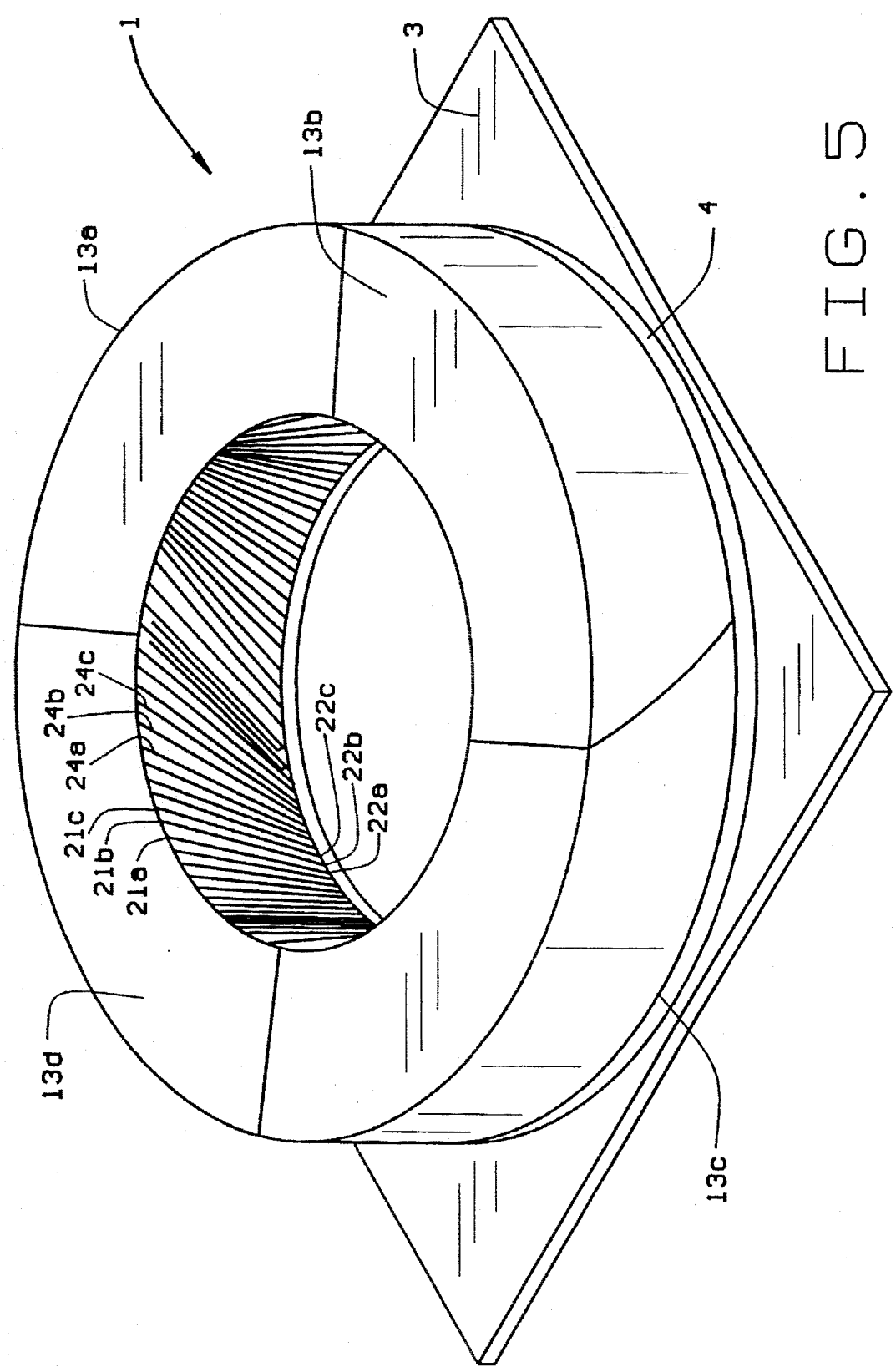
FIG. 5 shows a top perspective view of the preferred embodiment of the device.
Figure 6:
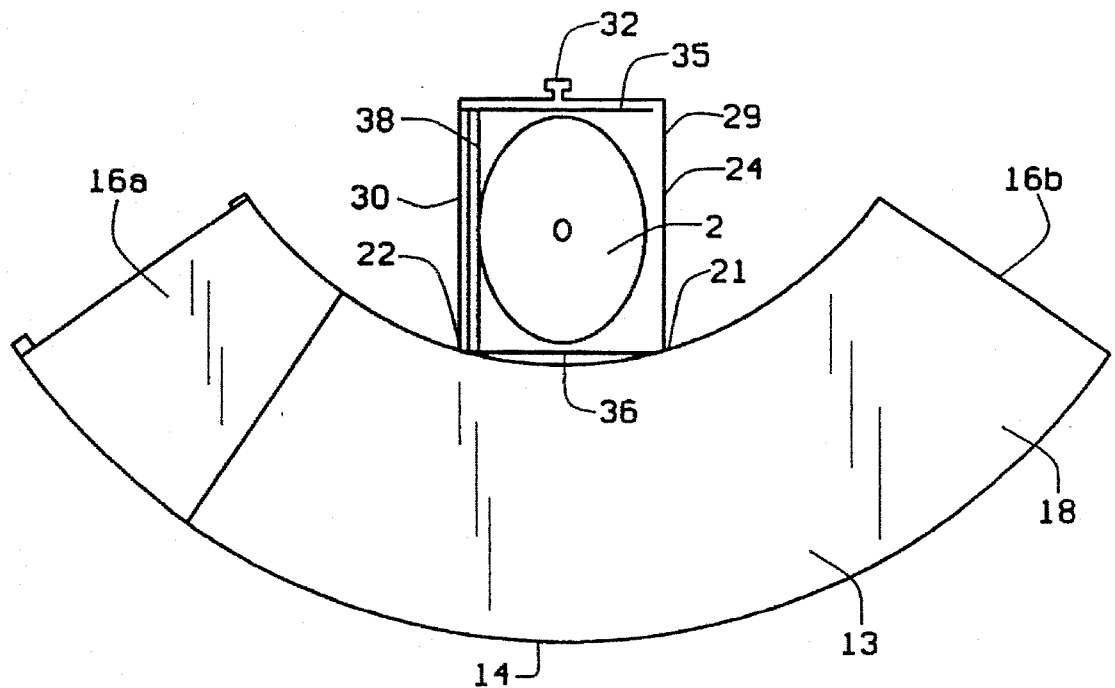
FIG. 6 shows a top elevational view of an inwardly opening tray cartridge.
Figure 8:
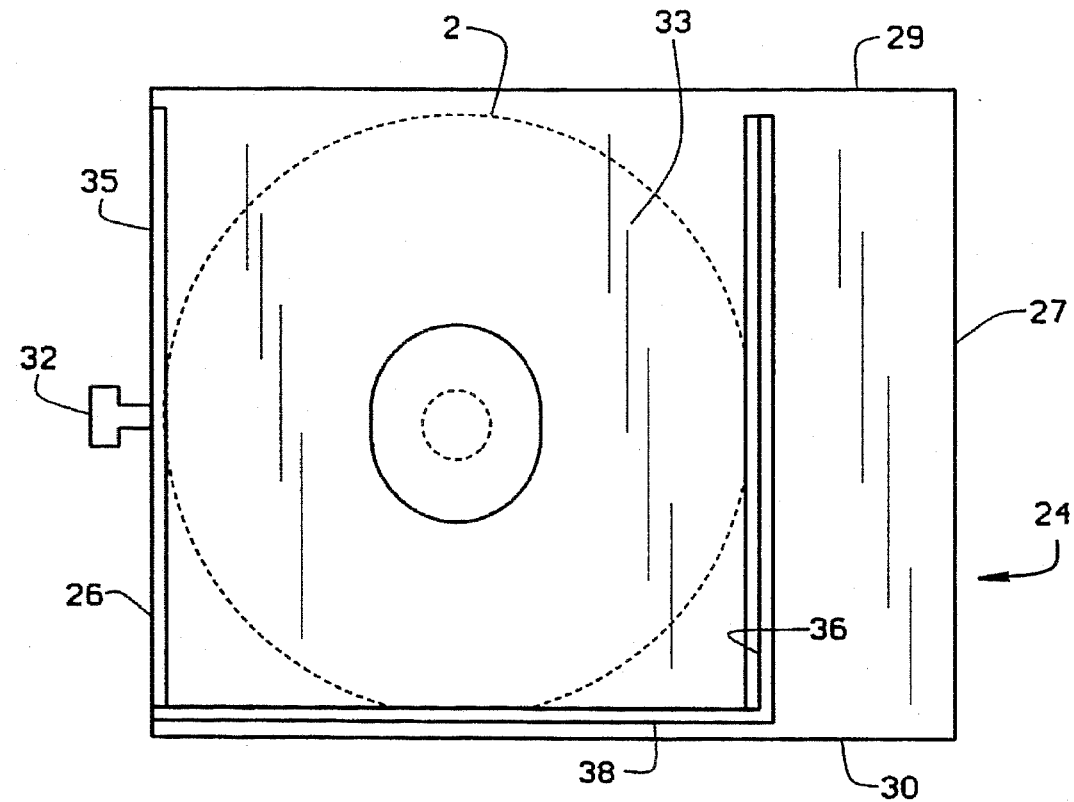
FIG. 8 shows a front elevational view of a preferred embodiment of a disk tray.
Figure 13:
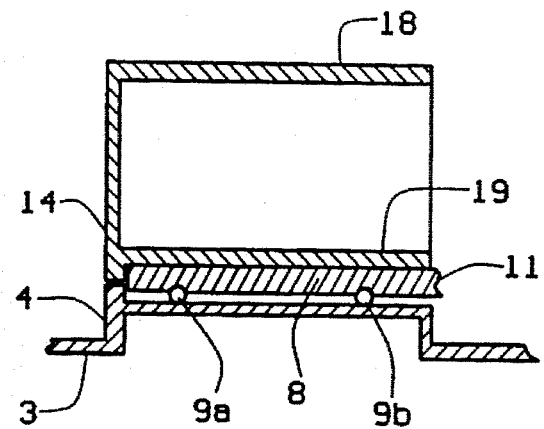
FIG. 13 shows a cutaway side elevational view of the tray cartridge and bearing ring.

FIG. 1 through 4 show schematic diagrams of possible arrangements of inter-leaved ISMs. A preferred embodiment of the device utilizing a wide diameter inter-leaved arrangement, for use with CDs and CD-ROMs is illustrated in FIG. 5. Carousel device 1 consists of base 3, which is largely square, Molded onto base 3 is raised circular platform 4. Bisecting raised circular platform 4 is slide groove 6 (best seen in FIG. 10). Positioned on raised circular platform 4 is bearing ring 8. As best seen in FIG. 13, bearing ring 8 is a flat, ring-shaped member of diameter identical to that of circular raised platform 4. Imbedded on underneath of bearing ring 8 are a multiplicity of bearings, bearings 9a and 9b being shown. Inner wall of bearing ring 8 is equipped with gear teeth 11. On bearing ring 8 sit a multiplicity of tray cartridges 13a to 13d, As best seen in FIG. 6, tray cartridge 13 consists of a curved outer wall 14, angled side walls 16a and 16b, top piece 18 and bottom piece 19. Within formed enclosure are a series of upper tray slide grooves 21a–c and lower tray slide grooves 22a–c, the grooves formed at an angle matching that of angled side walls 16a and 16b. Maintained between upper and lower slide grooves are a series of rectangular disk trays 24a–c. As best seen in FIG. 8, disk tray 24 is a rectangular piece of material, with edges generally defined as interior edge 26, exterior edge 27, upper slide 29, and lower slide 30. Upper and lower slides are maintained in disk cartridge upper and lower tray slide grooves, allowing the tray to slide in and out of the body of the tray cartridge. Gripping projection 32 is affixed to interior edge of tray. Projecting from face of tray is disk maintaining enclosure 33. Enclosure consists of interior beveled edge 35, exterior beveled edge 36, and bottom lip 38. Positioned largely in the center of disk maintaining enclosure is spindle cutout 40.

Figure 10:
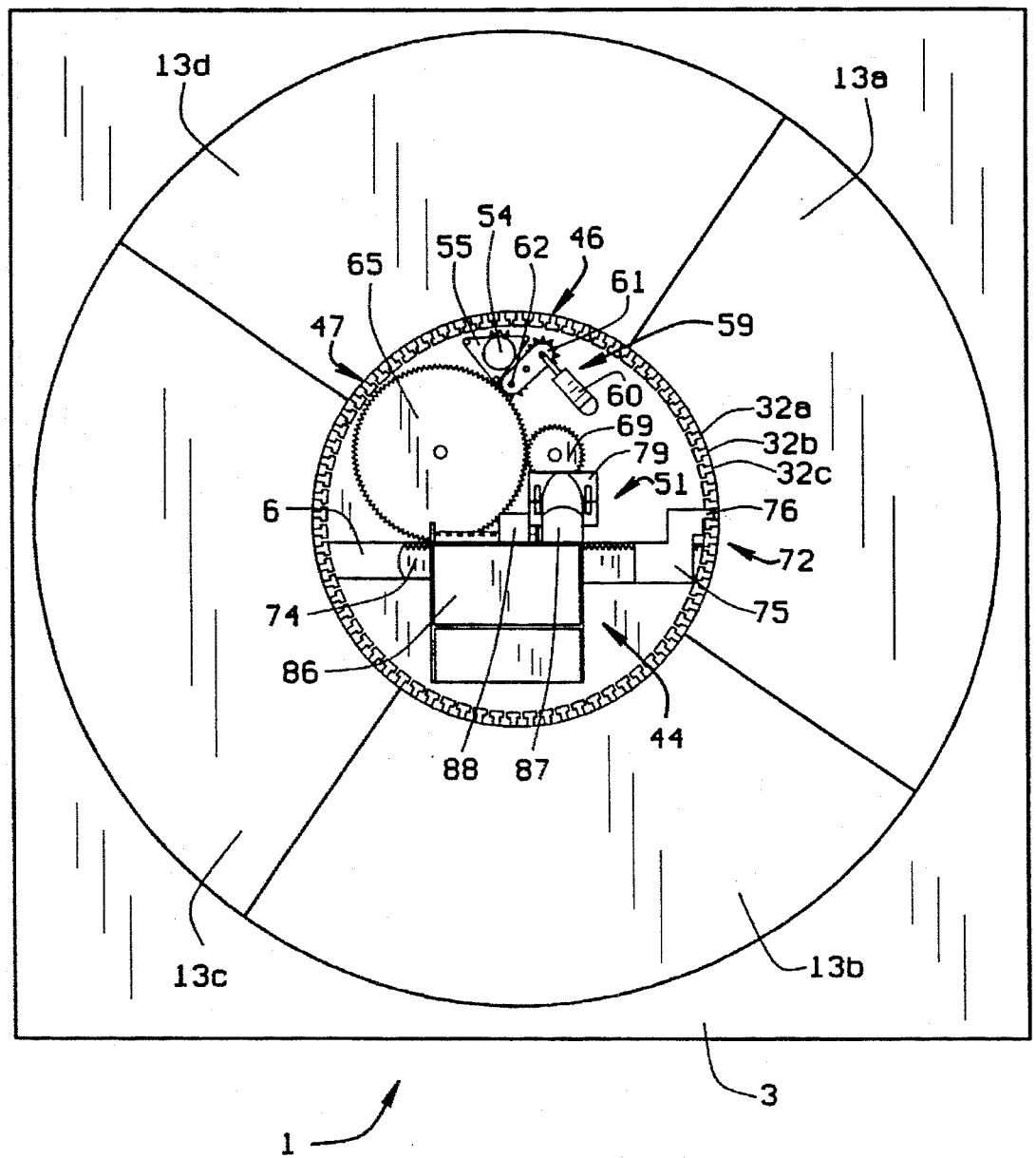
FIG. 10 shows a top elevational view of the preferred embodiment of the device.
Figure 11:
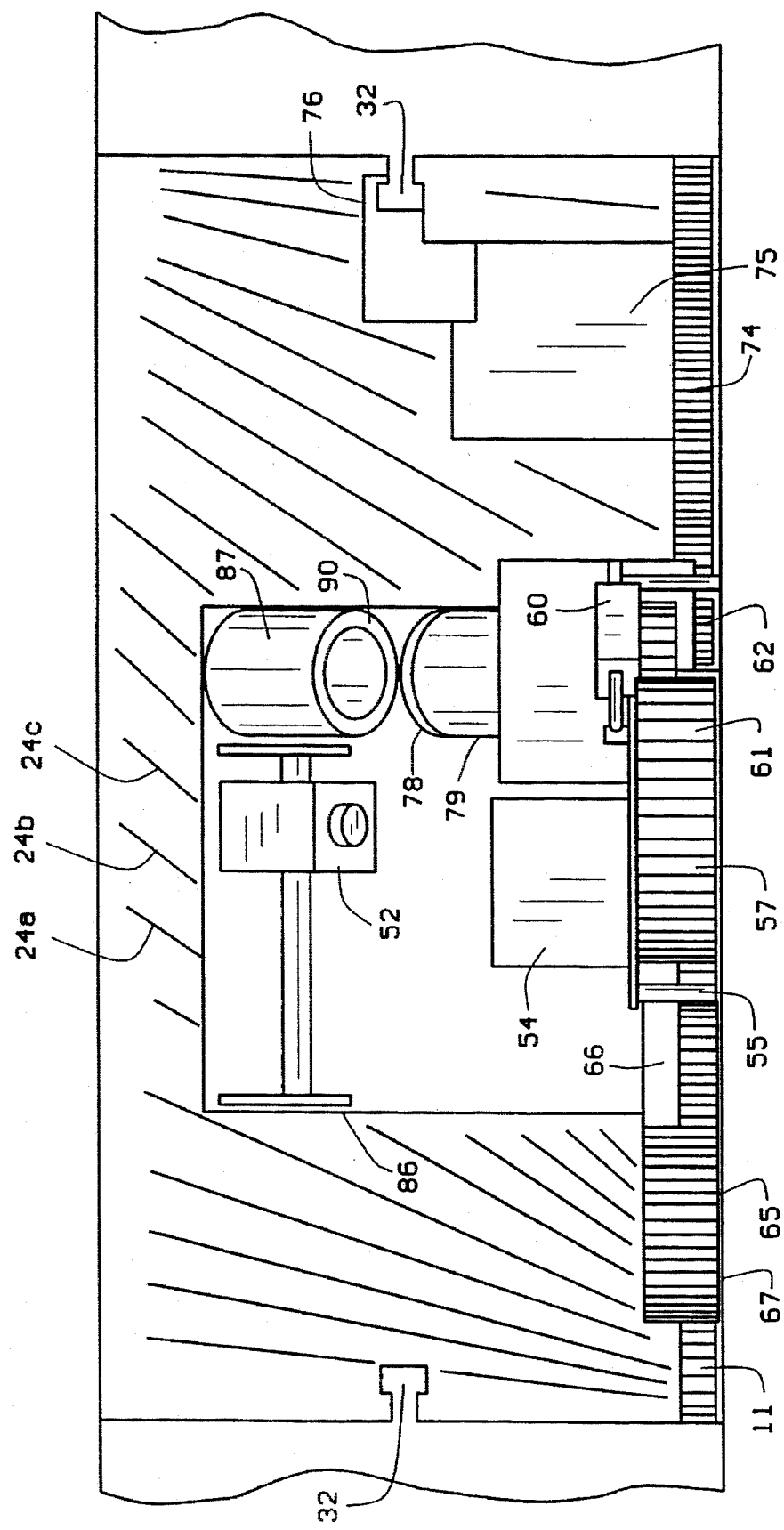
FIG. 11 shows a side elevational view of the disk retrieving and information accessing system.

Referring now to FIG. 10, multiplicity of disk cartridges form a circle. Within this circle is disk accessing mechanism 44, which consists of a number of sub-mechanisms: powering mechanism 46, gear drive mechanism 47, tray pulling assembly 72 and spindle mechanism 51 Powering mechanism 46 consists of motor 54, which is mounted on motor stand 55. Motor drives motor gear 57. Positioned close to motor is transfer assemble 59, which consists of solenoid 60, bearing ring transfer gear 61, and master transfer gear 62. Master gear 65 is formed with upper toothed level 66 and lower toothed level 67 (also seen in FIG. 11). Upper toothed level and lower toothed level are oppositely toothed, such that when upper level is toothed, lower level is untoothed, and when lower level is toothed, upper level is untoothed. Upper toothed level 66 connects master gear with spindle transfer gear 69. Spindle transfer gear 69 engages spindle screw gear 70. Lower toothed level 67 of master gear 65 engages tray pulling assembly 72. Tray pulling assembly 72 consists of slide 74. Projecting upward is gripping member base 75 (both best seen in FIG. 11). Gripping member 76 is affixed to gripping member base.

Figure 14:
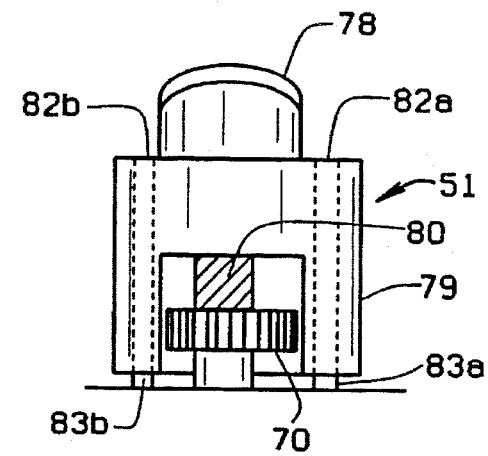
FIG. 14 shows a front elevational view of the spindle mechanism and information accessing mechanism.
Figure 15:
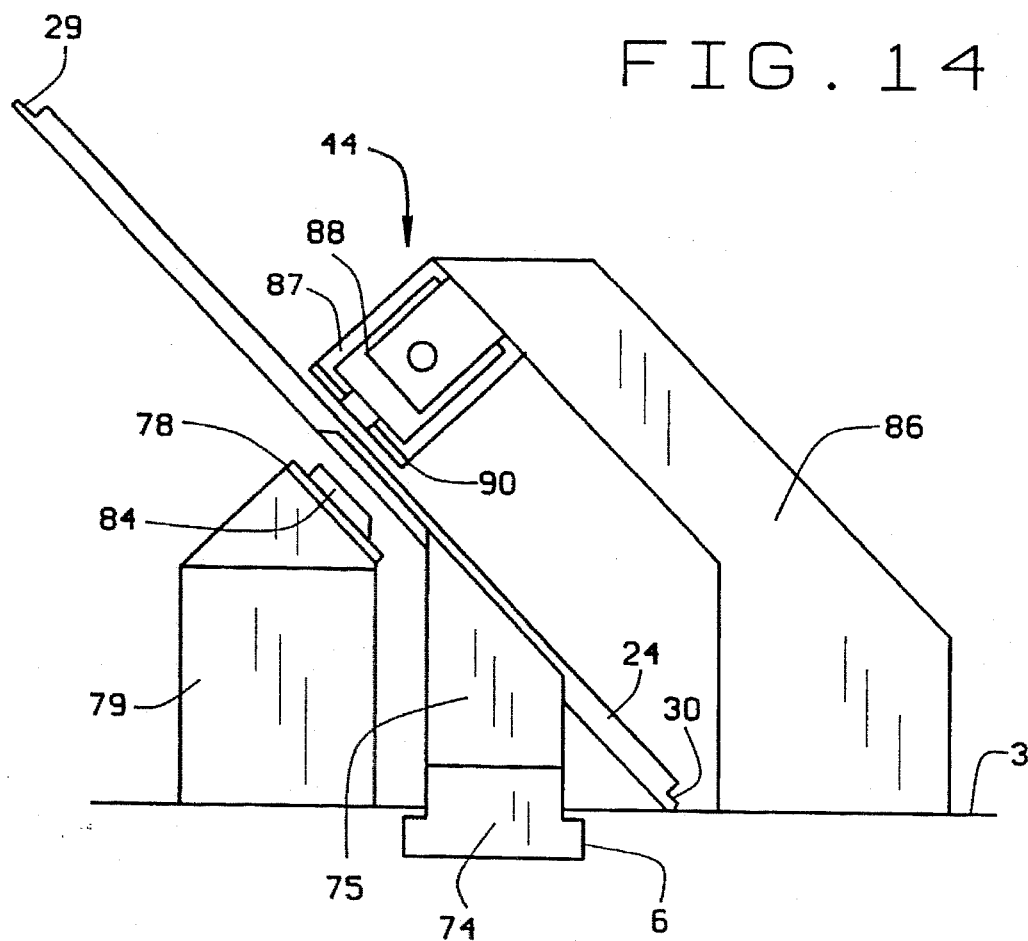
FIG. 15 shows a side elevational view of the spindle mechanism and information accessing mechanism.
Figure 16:
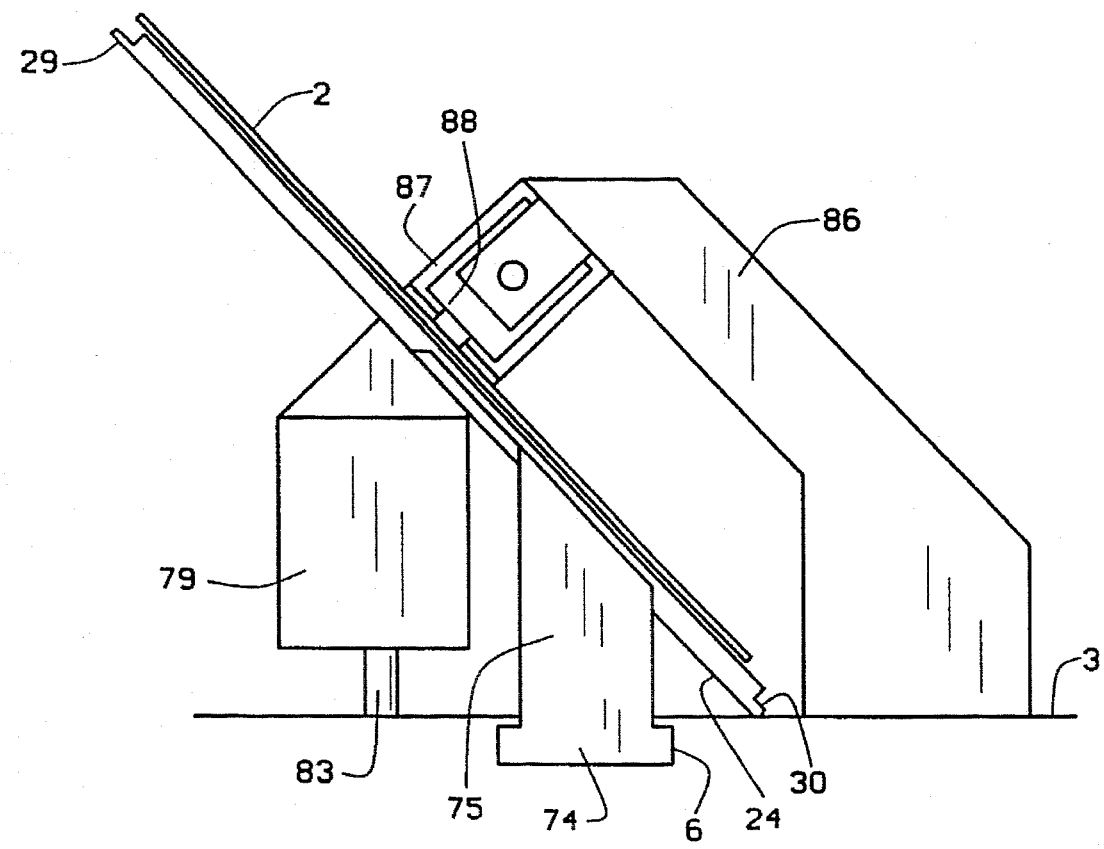
FIG. 16 shows a side elevational view of the spindle mechanism and information accessing mechanism, with a disk lifted from the tray.

FIG. 14 best illustrates spindle mechanism 51. Mechanism consists of spindle seat 78, spindle body 79, spindle lift screw 80, and guide slots 82a and 82b. Spindle guide slots are positioned on spindle guides 83a and 83b, allowing spindle body to move up and down. As best seen in FIG. 15, projecting from spindle seat 78 is disk catch projection 84. Input/Output (I/O) device consists of I/O base 86, drive motor 87, and reading device 88. Drive motor 87 contains drive motor seat 90 and cooperative disk catch opening 91.

OPERATION

Figure 12:
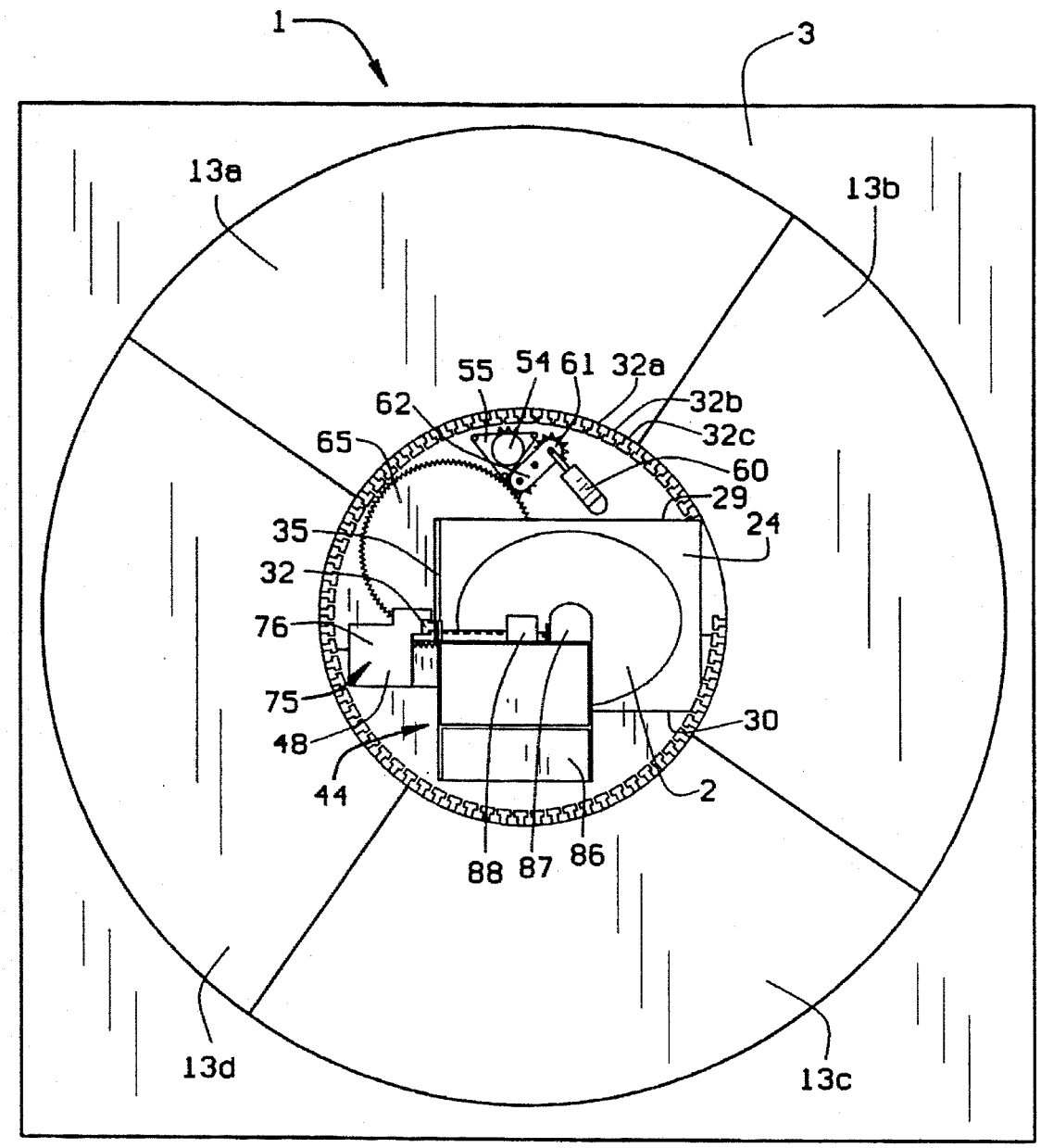
FIG. 12 shows a top elevational view of the disk retrieving and information accessing system with a tray situated in the mechanism.
Figure 17:
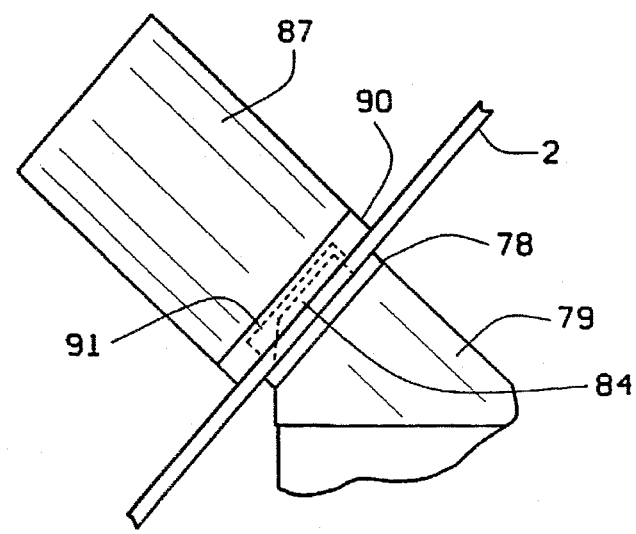
FIG. 17 shows a side elevational view of the spindle motor interlock.

In operation, a disk is selected. Solenoid 60 engages bearing transfer gear 61 with bearing ring 8 and motor gear 57, causing bearing ring and tray cartridges to rotate until desired disk is brought into position. Rotation stops, and solenoid 60 disengages bearing ring transfer gear 61 and engages master transfer gear 62 with motor gear 57 and master gear 65. As master gear turns, lower toothed level 67 engages tray pulling assembly 42, causing mechanism to slide backward. Gripping member 76 catches gripping projection 32 of disk tray, causing tray with disk to slide out of tray cartridge and between spindle mechanism 51 and accessing mechanism 44 (best seen in FIG. 12). With tray is positioned, teething on lower toothed level 67 ends, causing tray pulling mechanism to stop moving. Master gear 65 continues to turn, causing upper toothed level 66 to engage spindle transfer gear 69. Spindle transfer gear 69 causes spindle lift screw 80 to rotate, which causes spindle body 79 to rise. Spindle seat 78 rises through spindle cutout 40 of tray, causing disk catch projection 84 to engage center hole of disk. Spindle mechanism and I/O device are offset relative to the center hole of disk, causing disk to slide upward and backward before coming to rest on spindle seat 78. Spindle continues to lift disk until top of disk comes in contact with drive motor seat 90. Disk catch projection 84 engages cooperative disk catch opening 91, locking disk into place (best seen in FIG. 17). Drive motor 87 then spins disk, allowing information to be accessed. When information is retrieved, motor 54 reverses, causing master gear 65 to reverse. Spindle mechanism drops. Because disk is off-center, disk is deposited high on disk tray and slides down to rest on bottom lip, such that the disk re-positions itself. As master gear 65 continues to turn, upper toothed level 66 disengages and lower toothed level 67 re-engages, causing tray pulling device assembly to push tray back into tray cartridge. When tray is resituated in tray cartridge, solenoid causes master transfer gear to disengage and bearing ring transfer gear to re-engage, allowing the selection of a different disk.

Figure 7:
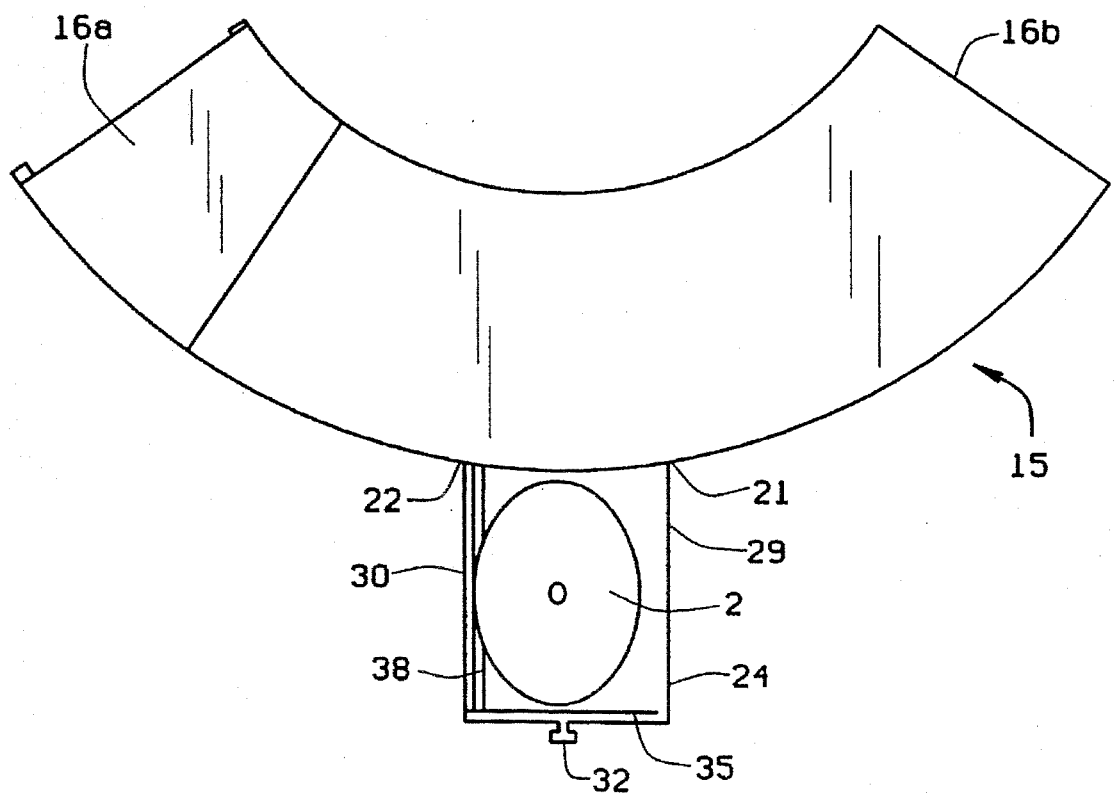
FIG. 7 shows a top elevational view of an outwardly opening tray cartridge.
Figure 9:
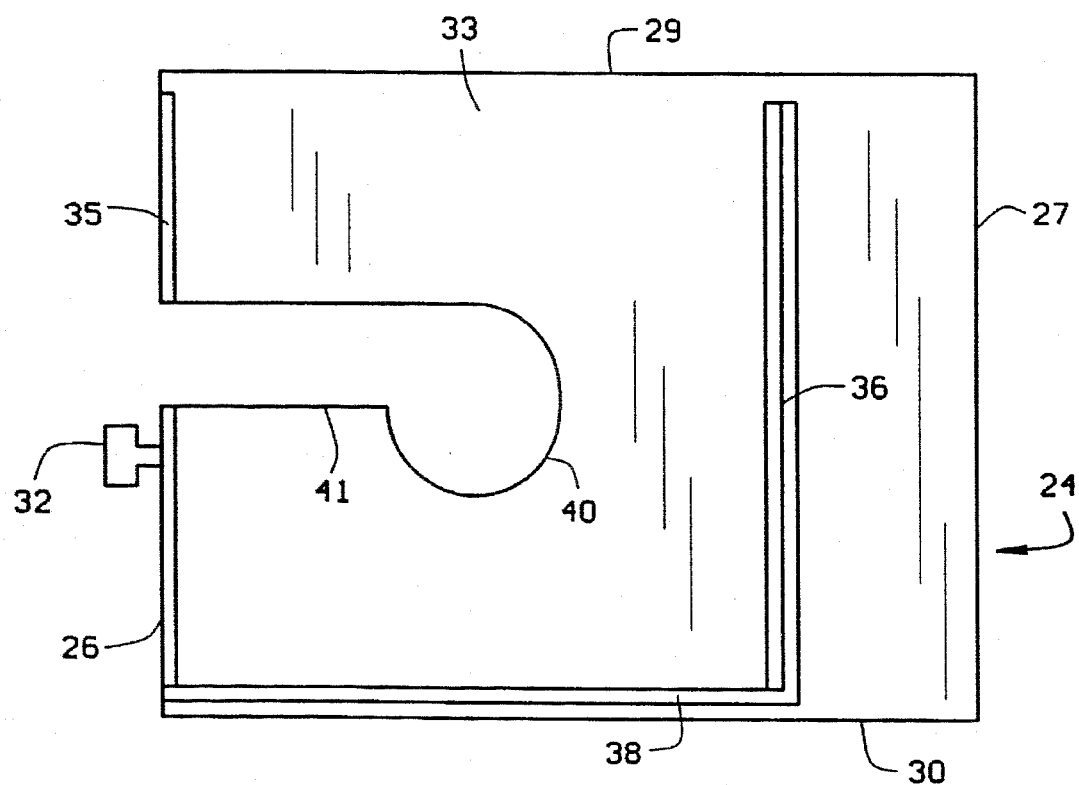
FIG. 9 shows a front elevational view of an additional embodiment of a disk tray.
Figure 18:
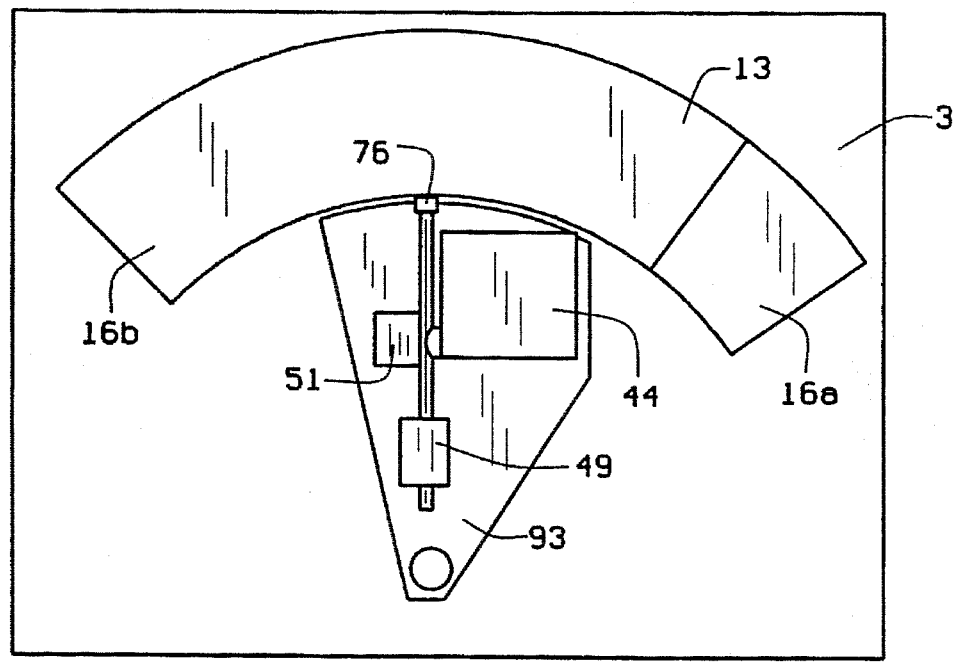
FIG. 18 shows a top elevational view of an alternative embodiment of the device utilizing a single tray cartridge.
Figure 19:
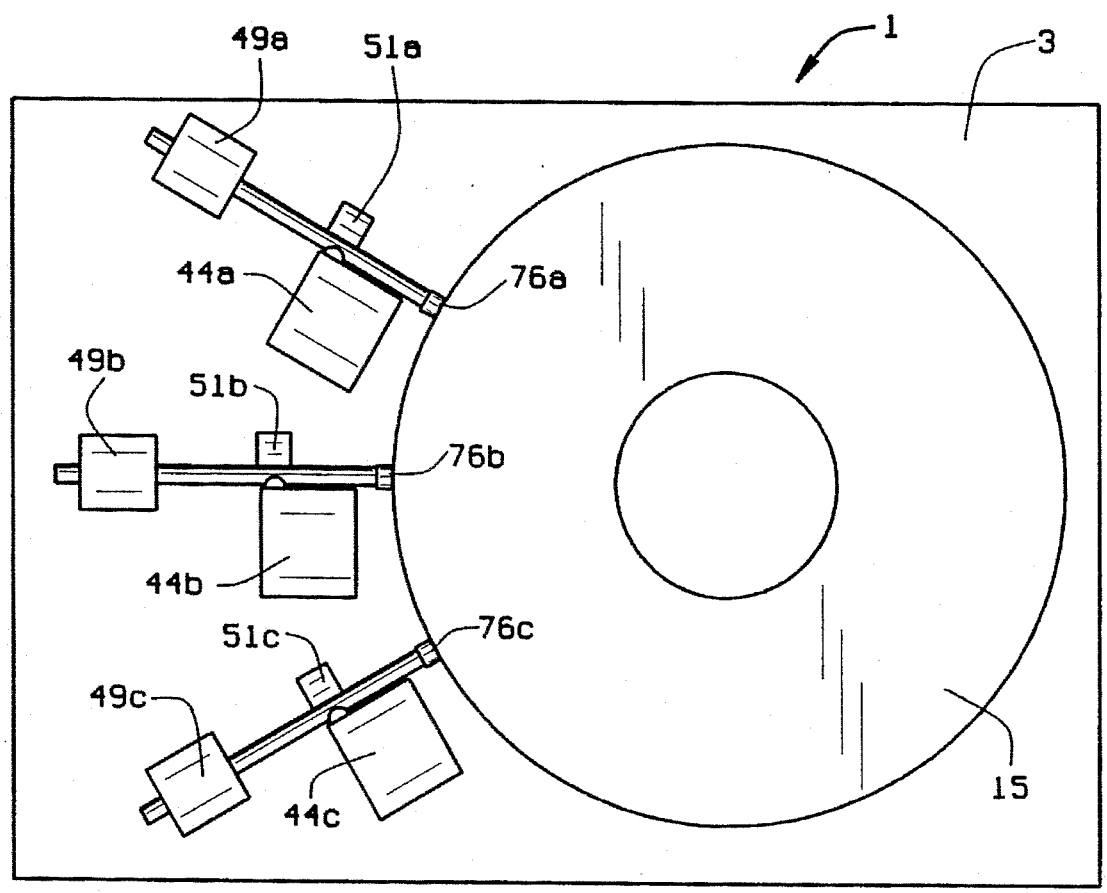
FIG. 19 shows a top elevational view of an alternative embodiment of the device utilizing multiple information accessing mechanisms.

In an alternative embodiment, disk accessing mechanism is mounted on pivot base 93, such that the mechanism pivots to come into position relative to the selected disk (as seen in FIG. 18). In a further alternative embodiment, disk tray is equipped with retracting cutout 41 (FIG. 9). which allows tray to be replaced in tray cartridge while disk is maintained in I/O device. This tray configuration allows the use of multiple disk accessing mechanisms (as seen in FIG. 19) in combination with exterior opening tray cartridge 15 (FIG. 7).

Figure 20:
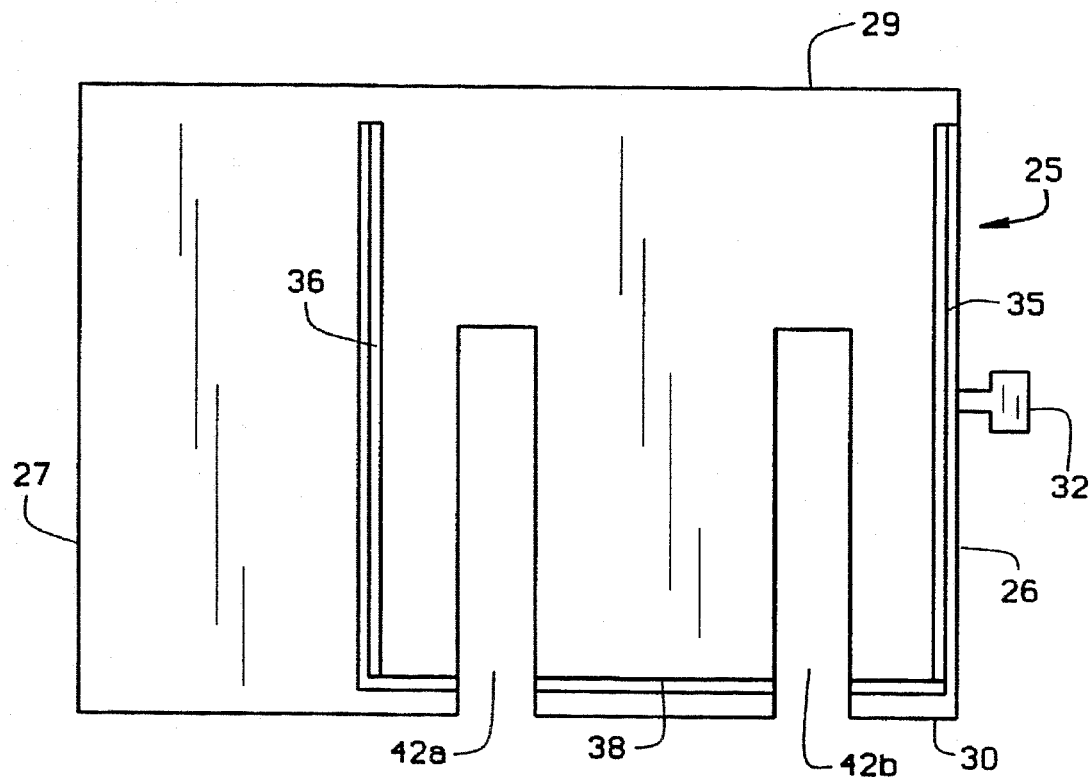
FIG. 20 shows an additional preferred embodiment of an ISM tray.
Figure 21:
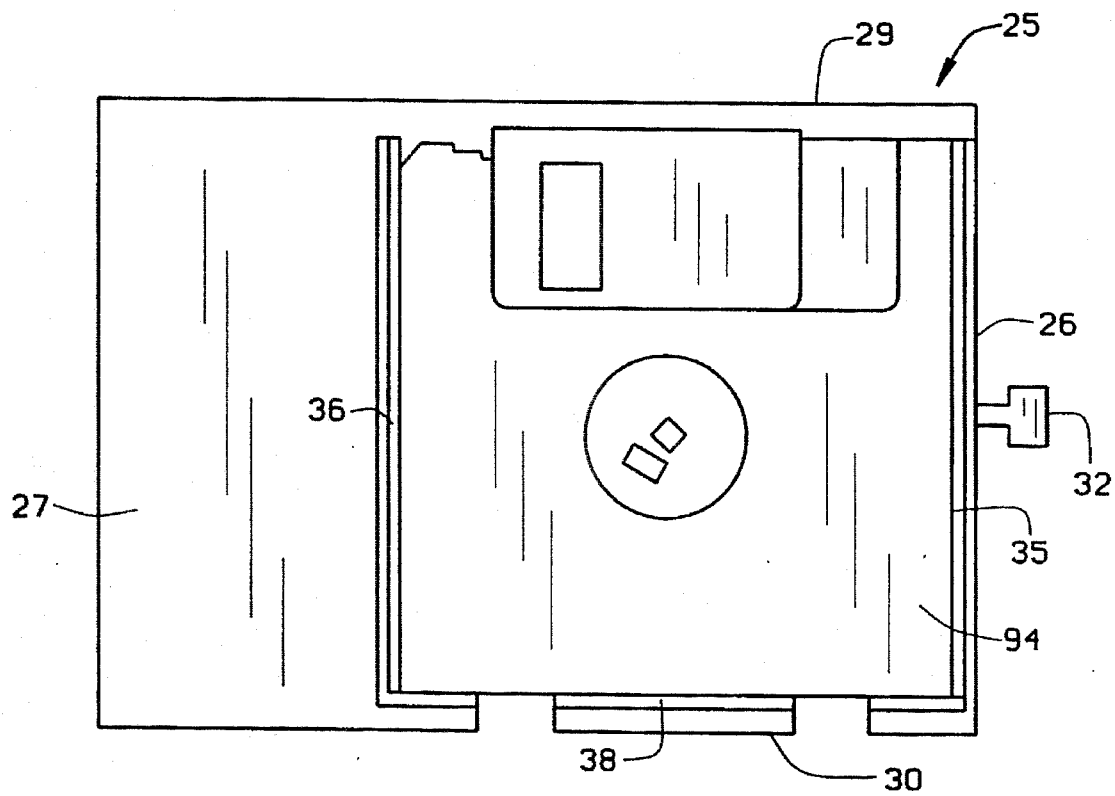
FIG. 21 shows a side elevational view of an additional preferred embodiment of an ISM tray with an ISM in place.
Figure 22:
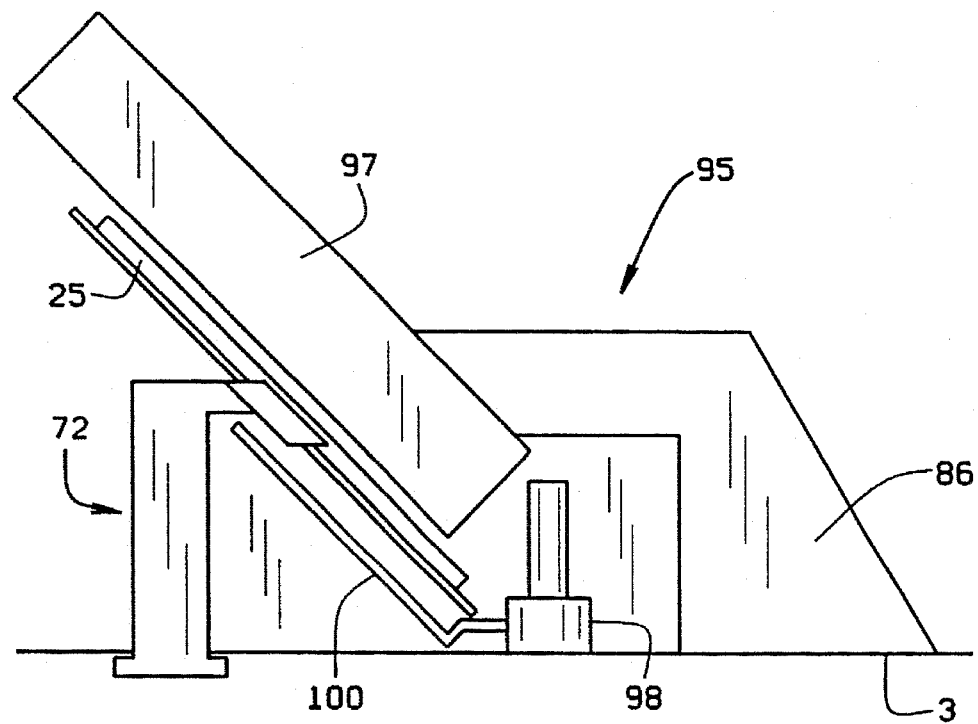
FIG. 22 shows a side elevational view of an additional embodiment of the device illustrating the ISM retrieving device and the information accessing mechanism.
Figure 23:
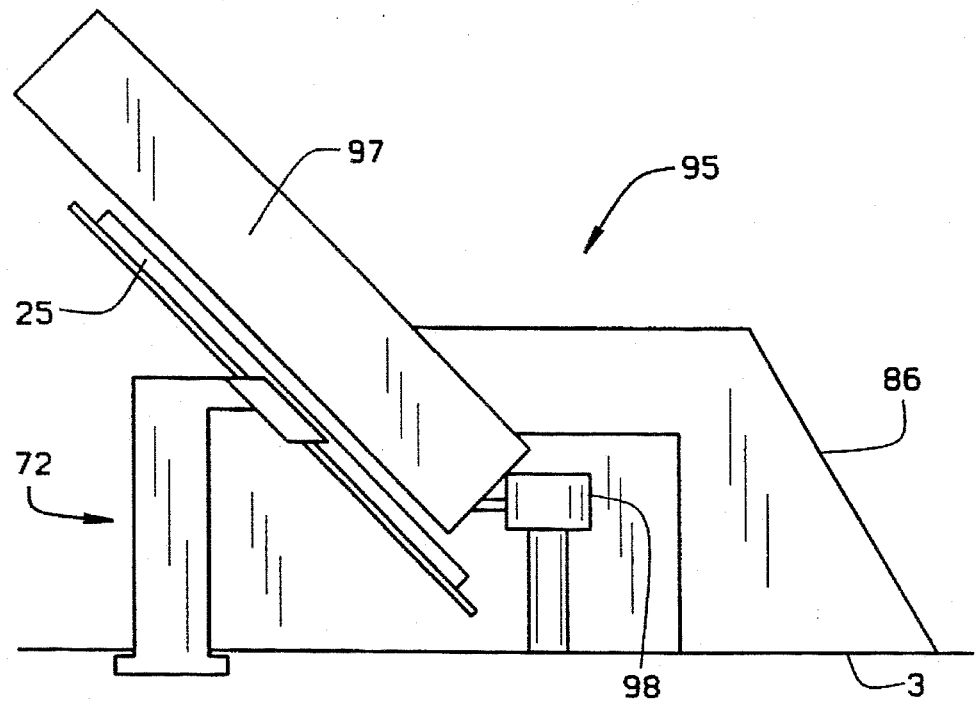
FIG. 23 shows a side elevational view of the additional preferred embodiment, with the ISM lifted from the tray.
Figure 24:
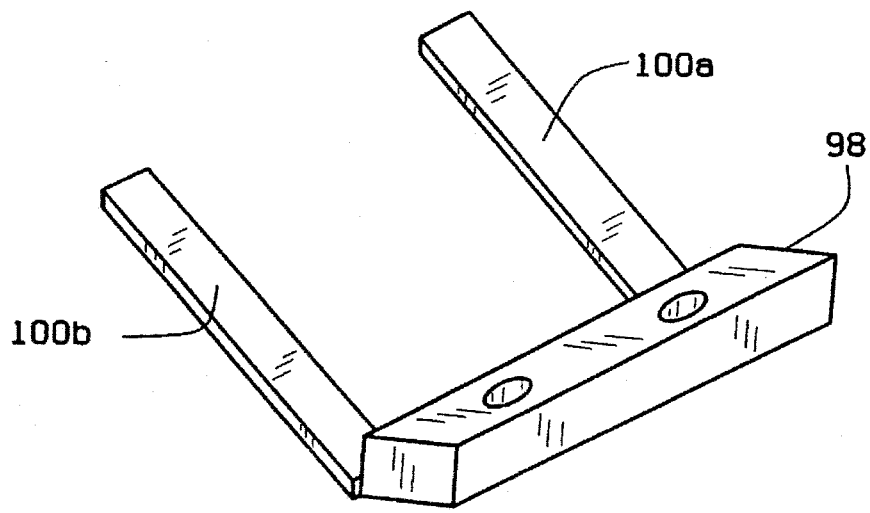
FIG. 24 shows a perspective view of the ISM lifting mechanism.

In an additional preferred embodiment designed for squarish ISMs (seen in FIG. 22), ISM accessing mechanism consists of tray pulling assembly 72, ISM reading assembly 97 and ISM lifting assembly 98. ISM tray 25 (As seen in FIG. 20) consists of interior beveled edge 35, exterior beveled edge 37, bottom lip 38, gripping projection 32, and lift cutouts 42a and 42b.

Figure 25:
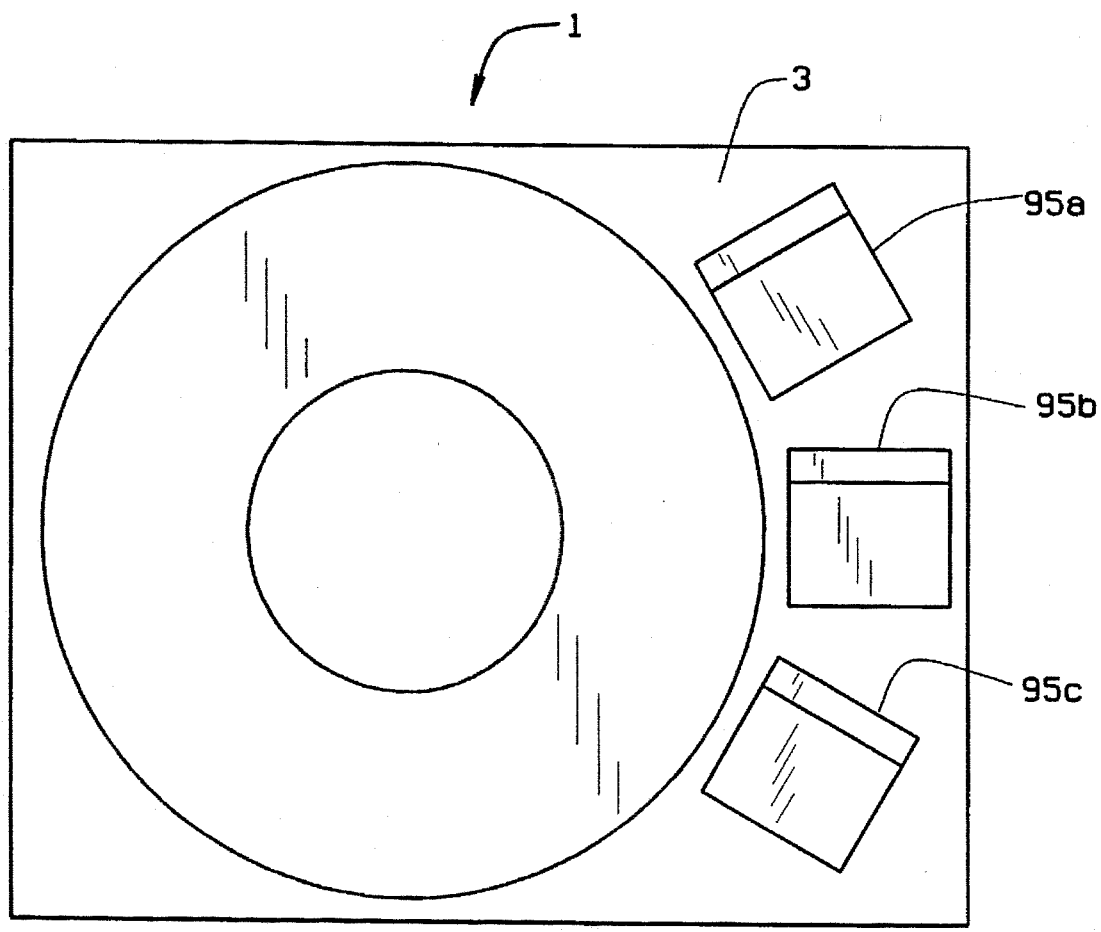
FIG. 25 shows a top elevational view of an additional embodiment of the device utilizing multiple information accessing mechanisms.
Figure 26:
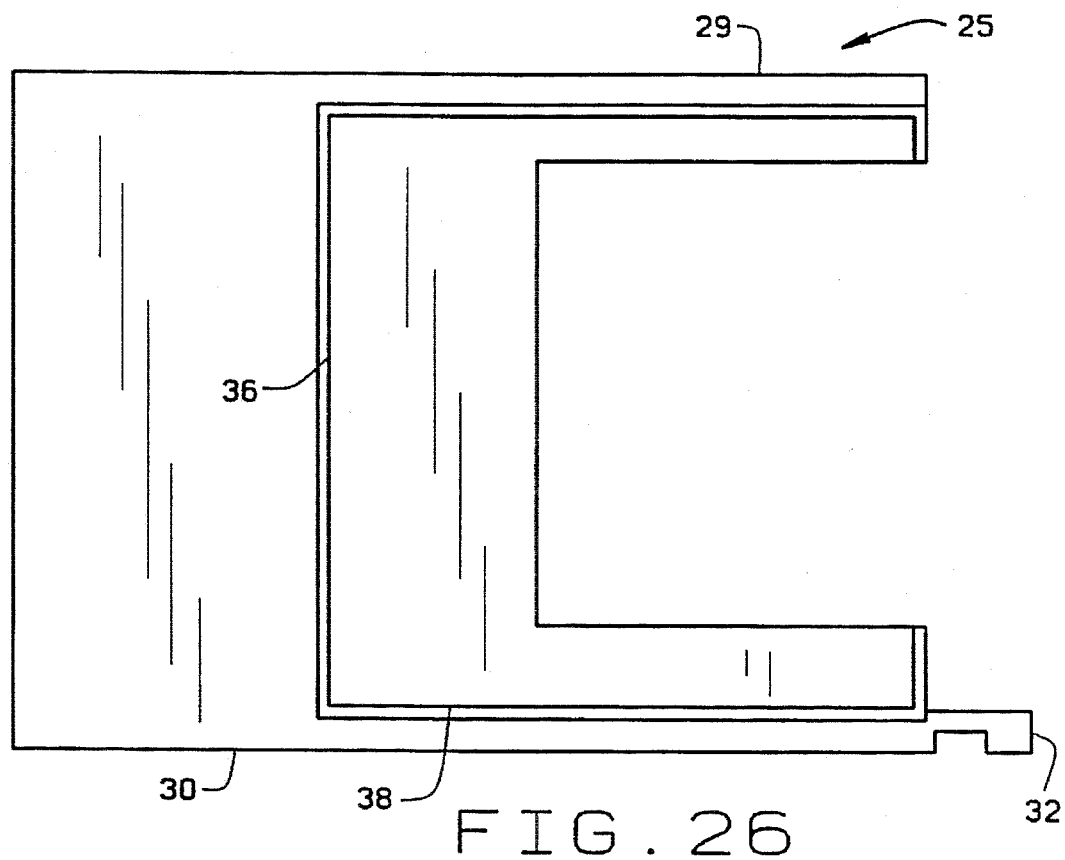
FIG. 26 shows a side elevational view of an alternative embodiment of an ISM tray.
Figure 27:
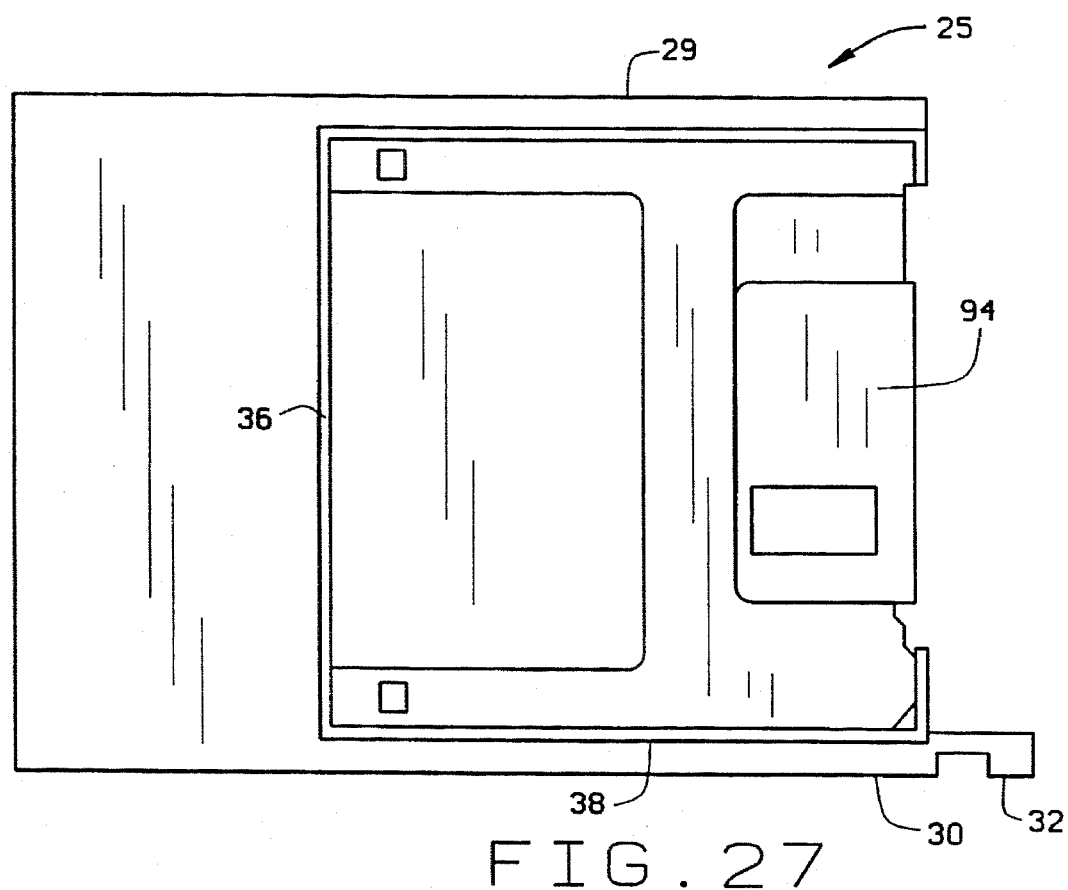
FIG. 27 shows a side elevational view of an alternative embodiment of the ISM tray with an ISM in place.

In operation, tray pulling assembly 72 pulls ISM tray between ISM lifting device 98 and ISM reading assembly 97. When tray is positioned, ISM lifting assembly 98 rises, causing ISM lift members 100a and 100b to pass through lift cutouts 42a and 42b of tray. ISM 94 is lifted and pressed into ISM reading assemble. ISM tray 25 may then be returned to tray cartridge. This configuration allows the use of multiple ISM accessing mechanisms (as seen in FIG. 25). In an alternative embodiment, ISM tray 25 (best seen in FIG. 26 and 27) is designed to slide directly into ISM reading assembly.

SUMMARY, RAMIFICATIONS AND SCOPE

Accordingly, the reader will see that the inter-leaved design provides a device which will allow the storage and accessing of a large number of ISMs, allows for a simple device, and allows a device in which the ISMs are self-repositioning. It should be noted, however, that while the above contains a preferred embodiment of a device, it is the idea of the inter-leaved design which is central to this invention. There are innumerable options in terms of the device which maintains ISMs in this inter-leaved arrangement. For instance, the preferred embodiment utilizes tray cartridges. However, instead of cartridges it is possible to use a spokes wheel on a central axis, or a circular base with tray guides. There are a multiplicity of different devices which can maintain ISMs in the inter-leaved arrangement. Further, while the preferred embodiment discloses a device in which the trays slide out of the cartridge, it is also possible for the tray to pivot out, in, or up or down, to bring the ISM to the input/output device. In the preferred embodiment, the ISM is completely removed from the cartridge, but it is also possible to the ISM to remain partly in the cartridge or carousel, or even not be removed at all, the preferred embodiment utilizes trays to maintain the ISMs, however it is not necessary to utilize trays. Instead, the ISMs may rest on their edges. There are a wide number of variations possible in terms of the inter-leaved arrangement. It should also be noted that a wide variety of materials may be used in construction of the device. The scope of the invention, therefore, should be determined by the appended claims and their legal equivalent, rather than by the examples given.

I claim:

1. An apparatus for storing and accessing information storage media, the apparatus comprising:

a tray magazine having a length and a base surface that extends along the length of the tray magazine;

a plurality of trays mounted on the magazine base, each tray being generally planar and having a peripheral edge surrounding a support surface, the support surface having a configuration for receiving and supporting an information storage medium thereon, and the plurality of trays being mounted on the base with the trays arranged side by side and in an interleaved arrangement with each tray positioned at an acute angle relative to the base, each tray being mounted on the base for translatory movement of the tray between a retracted position of the tray where the tray is positioned angle over the base and an extended position of the tray where the tray is positioned at the acute to one side of the base, means for moving the tray between the reacted and extended positions while maintaining the tray at the acute angle as it translates between the retracted and extended positions of the tray relative to the base; and, means for accessing information contained on an information storage medium supported on a tray of the plurality of trays including a spindle positioned adjacent the magazine base and beneath a tray moved to the extended position of the tray relative to the base, and means for moving the spindle in a reciprocating path perpendicular to the base between a lowered position of the spindle relative to the base where the spindle is positioned beneath the tray when the tray is in the extended position, and a raised position of the spindle relative to the base where the spindle is positioned above the tray when the tray is in the extended position.

2. The apparatus of claim 1, wherein:

the tray magazine has a linear length.

3. The apparatus of claim 1, wherein:

the tray magazine has an arcuate length.

4. The apparatus of claim 3, wherein:

the tray magazine is one of a plurality of tray magazines that are assembled together in a circular carousel.

5. The apparatus of claim 1, wherein:

the tray magazine has a circular configuration and the length of the tray magazine is the circumference of its circular configuration.

6. The apparatus of claim 1, wherein:

each tray of the plurality of trays has an opening through its support surface and the spindle passes through the opening of an extended tray when the spindle is moved between the lowered and raised positions of the spindle relative to the base.

7. The apparatus of claim 6, wherein:

the spindle is configured to lift an information storage medium from the support surface of the extended tray and move the information storage medium above and laterally over the support surface of the extended tray when the spindle is moved from the lowered to the raised position of the spindle.

8. The apparatus of claim 1, wherein:

the base is positioned in a horizontal plane and information storage media are held on the support surfaces of the plurality of trays by gravity.

9. The apparatus of claim 1, wherein:

the support surface of each tray has a bottom lip projecting therefrom adjacent a bottom edge of the tray, the bottom lip being positioned on the support surface to engage an information storage medium placed on the tray support surface and prevent the information storage medium from sliding off the bottom edge of the tray.

10. The apparatus of claim 9, wherein:

the support surface of each tray has an exterior edge projecting therefrom adjacent a rearward edge of the tray, the exterior edge is positioned on the support surface to engage an information storage medium placed on the tray support surface and prevent the information storage medium from rolling off the rearward edge of the tray.

11. An apparatus for storing and accessing information storage media, the apparatus comprising:

a tray magazine having a length and a base that extends along the magazine length;

a plurality of trays mounted on the magazine base for translatory movement of each tray relative to the base between a retracted position where the tray is positioned over the base, and an extended position where the tray is displaced from over the base, each tray being generally planar and being configured to support an information storage medium, the plurality of trays being mounted on the base with the trays arranged side-by-side and in an inter-leaved arrangement with each tray positioned at an acute angle relative to the base and means for moving the tray between the retracted and extended positions while maintaining the tray at the acute angle relative to the base when the tray translates between its extended position and its retracted position; and, means for accessing information contained on an information storage medium supported on a tray at the extended position of the tray relative to the base, said means including a spindle positioned beneath the extended tray, the spindle being movable relative to the base and the extended tray between a lowered position of the spindle beneath the extended tray and a raised position of the spindle above the extended tray, and the spindle is configured to engage with an information storage medium supported on the extended tray as the spindle is moved from the lowered to the raised position and to move the information storage medium above and laterally over the extended tray and the spindle is configured to cause the information storage medium to move laterally back over the tray repositioning the information storage medium on the tray as the spindle is moved from the raised to the lowered position.

12. The apparatus of claim 11, wherein:

each tray of the plurality of trays has an opening through its support surface and the spindle extends through the opening of an extended tray when the spindle is moved between the lowered and raised positions of the spindle relative to the base.

13. The apparatus of claim 11, wherein:

a drive motor and a reading device are provided on the apparatus positioned above the spindle where the drive motor drives the spindle and an information storage medium on the spindle and the reading device reads information from the driven information storage medium when the spindle is in the raised position relative to the base.

14. The apparatus of claim 11, wherein:

the spindle and the tray magazine move relative to each other.

15. The apparatus of claim 14, wherein:

the tray magazine has an arcuate length and the spindle and magazine move in arc segments relative to each other.

16. The apparatus of claim 15, wherein:

the tray magazine is one of a plurality of tray magazines that are assembled together in a circular carousel.

17. The apparatus of claim 14, wherein:

the tray magazine is circular and the spindle and magazine rotate relative to each other.

18. The apparatus of claim 11, wherein:

the support surface of each tray has a bottom lip projecting therefrom adjacent a bottom edge of the tray, the bottom lip being positioned on the support surface to engage an information storage medium placed on the tray support surface and prevent the information storage medium from sliding off the bottom edge of the tray.

19. The apparatus of claim 18, wherein:

the support surface of each tray has an exterior edge projecting therefrom adjacent a rearward edge of the tray, the exterior edge is positioned on the support surface to engage an information storage medium placed on the tray support surface and prevent the information storage medium from rolling off the rearward edge of the tray.

* * * * *